United States Patent
Giandalia et al.

(10) Patent No.: US 6,987,678 B2
(45) Date of Patent: Jan. 17, 2006

(54) SWITCHING VOLTAGE REGULATOR FOR SWITCH MODE POWER SUPPLY WITH PLANAR TRANSFORMER

(75) Inventors: Marco Giandalia, Palermo (IT); Marco Passoni, Pavia (IT)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/693,153

(22) Filed: Oct. 23, 2003

(65) Prior Publication Data
US 2004/0130913 A1 Jul. 8, 2004

Related U.S. Application Data

(60) Provisional application No. 60/420,914, filed on Oct. 23, 2002.

(51) Int. Cl.
*H02M 5/42* (2006.01)

(52) U.S. Cl. .................. 363/86; 363/127; 363/16
(58) Field of Classification Search .................. 363/86, 363/127, 16
See application file for complete search history.

(56) References Cited

U.S. PATENT DOCUMENTS 5,619,403 A * 4/1997 Ishikawa et al. ......... 363/21.06

* cited by examiner

*Primary Examiner*—Shawn Riley
(74) *Attorney, Agent, or Firm*—Ostrolenk, Faber, Gerb & Soffen, LLP

(57) ABSTRACT

A power supply has an output circuit for a secondary stage of a converter that switches on and off a switching device such that the output voltage of the converter is regulated across a capacitor without use of an inductor in the output circuit. For example, the switching device is a semiconductor field effect transistor controlled by a comparator. The output circuit may be used with a switch mode power supply comprising a coreless, planar isolation transformer.

14 Claims, 8 Drawing Sheets

SWITCHING VOLTAGE REGULATOR FOR SWITCH MODE POWER SUPPLY WITH PLANAR TRANSFORMER

RELATED APPLICATION

This application claims the benefit of U.S. Provisional Application No. 60/420,914, filed Oct. 23, 2002, entitled "Switching Voltage Regulator for Switch Mode Power Supply with Planar Transformer," which is incorporated in its entirety by reference herein.

FIELD OF THE INVENTION

This invention relates to switch mode power supplies (SMPS) and more specifically relates to an SMPS having a planar transformer and a secondary circuit for voltage regulation without use of an inductor in the output circuit.

BACKGROUND OF THE INVENTION

Switch mode power supplies are well known. In an isolated switch mode power supply using an input transformer with isolated primary and secondary windings, step-down regulation is needed to supply the load with a desired rated voltage. Step-down regulation in the secondary stage of such an SMPS in commonly obtained by using an inductor to increase the output impedance of the source. For example, FIG. 1 shows the secondary stage of a known SMPS. An alternating current (AC) input is applied to primary winding 20 of transformer 21. The secondary winding 22 is connected to rectifiers 23 and 24 which are connected to direct current (DC) capacitors 25 and 26. The output of capacitors 25 and 26 is connected as shown to an output circuit 17 comprising high side and low side switches 27 and 28, respectively, which may be MOSFETs operated to alternately open and close with a timing determined to maintain a predetermined fixed voltage on output capacitor 29. Such circuits require the inductor 30 to increase the output impedance of the source, thereby operating as a charge storage element to smooth the switched output of the transistor switches.

The inductor 30 is a large, inefficient component. It would be desirable to provide an SMPS circuit which does not require an inductor in the output circuit.

SUMMARY OF THE INVENTION

According to the invention, a secondary converter is provided comprising a switching device and an output voltage sensing and control circuit to switch the switching device, providing voltage regulation across a capacitor without using an inductor in the output circuit.

For example, the secondary converter is used with a planar transformer which is formed on a flat circuit board. One advantage of the planar transformer using the secondary converter is that the output impedance of the planar transformer at a frequency of 1 megahertz may be about 30 ohms, which is much less than that of the output stage.

Other features and advantages of the present invention will become apparent from the following description of the invention which refers to the accompanying drawings.

DETAILED DESCRIPTION OF THE PREFERRED EMBODIMENTS

Figure 2A:
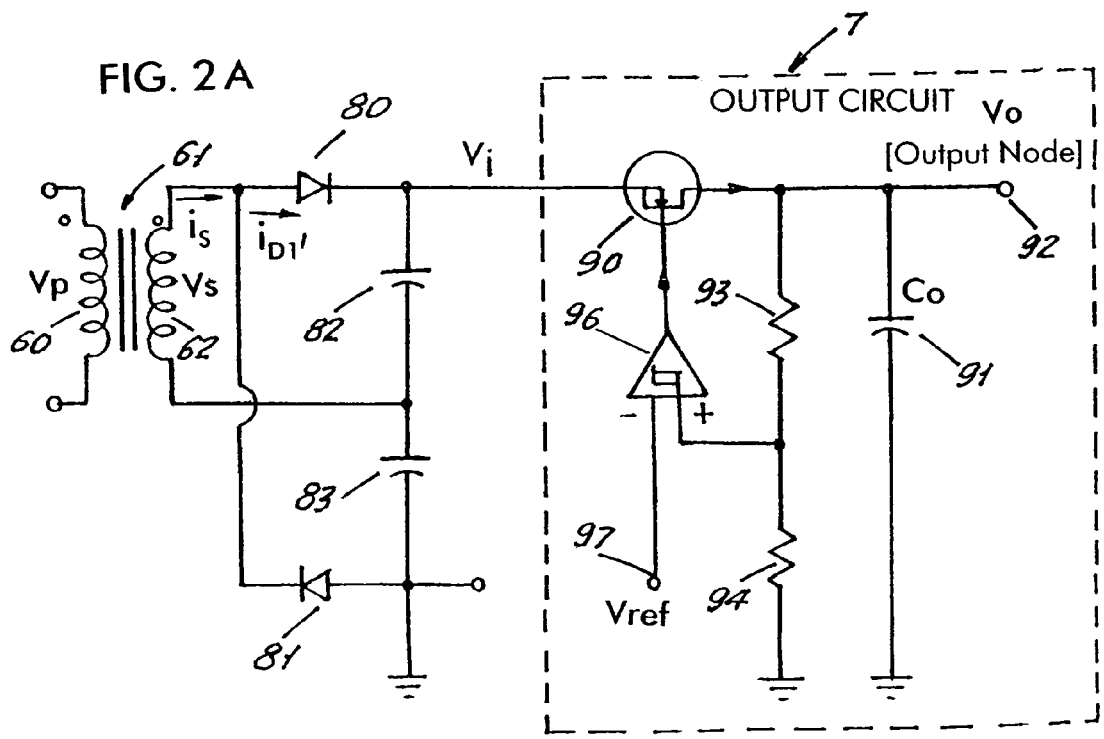
FIG. 2A shows one embodiment of a secondary converter coupled to a secondary of a planar transformer.
Figure 2B:
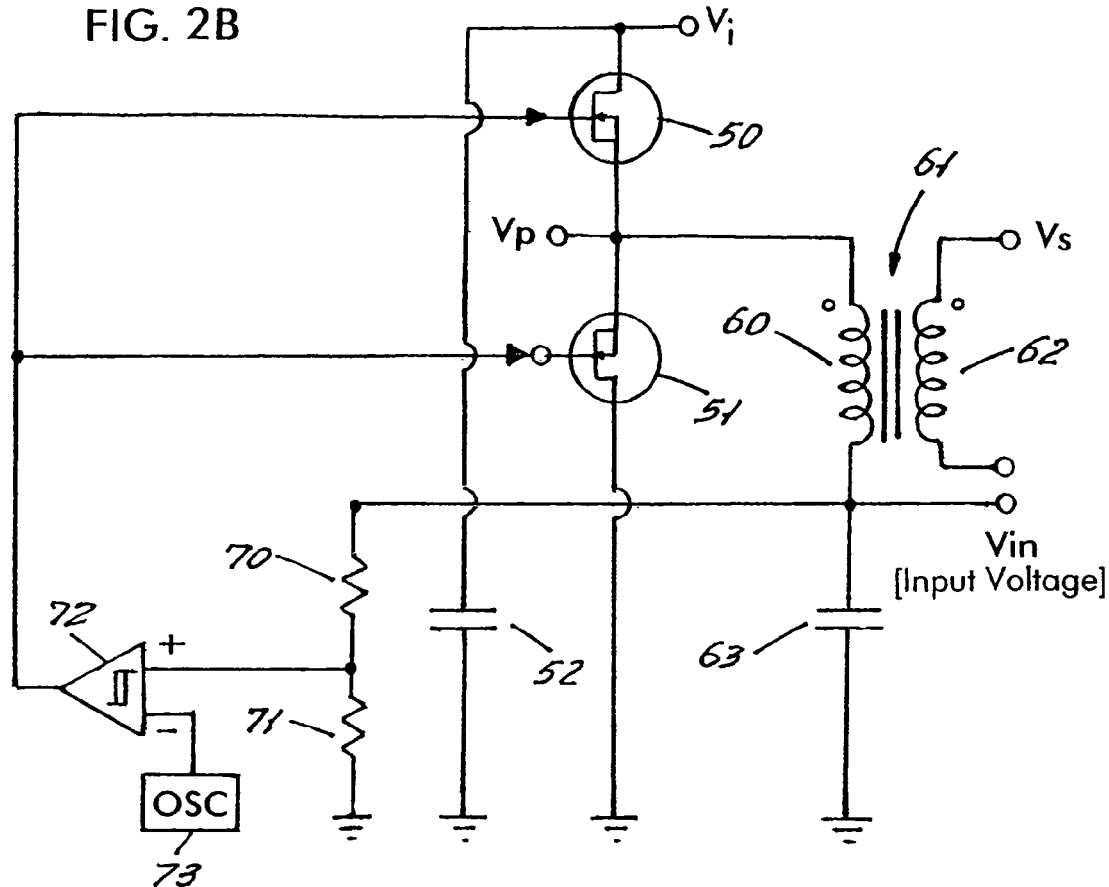
FIG. 2B shows a primary stage coupled to the primary of the planar transformer.

Referring to FIGS. 2A and 2B, an SMPS circuit is shown having a step-down converter, FIG. 2A, and a primary circuit, FIG. 2B. A regulated voltage $V_1$ is applied across high side and low side switching devices (e.g. MOSFETs) 50, 51 and a capacitor 52 having a capacitance C1. The node between MOSFETs 50 and 51 is connected to one end of a primary winding 60 of a planar transformer 61. A secondary winding 62 of transformer 61 is magnetically coupled to the primary winding 60. For example, the transformer 61 is a planar isolation transformer.

Figure 5A:
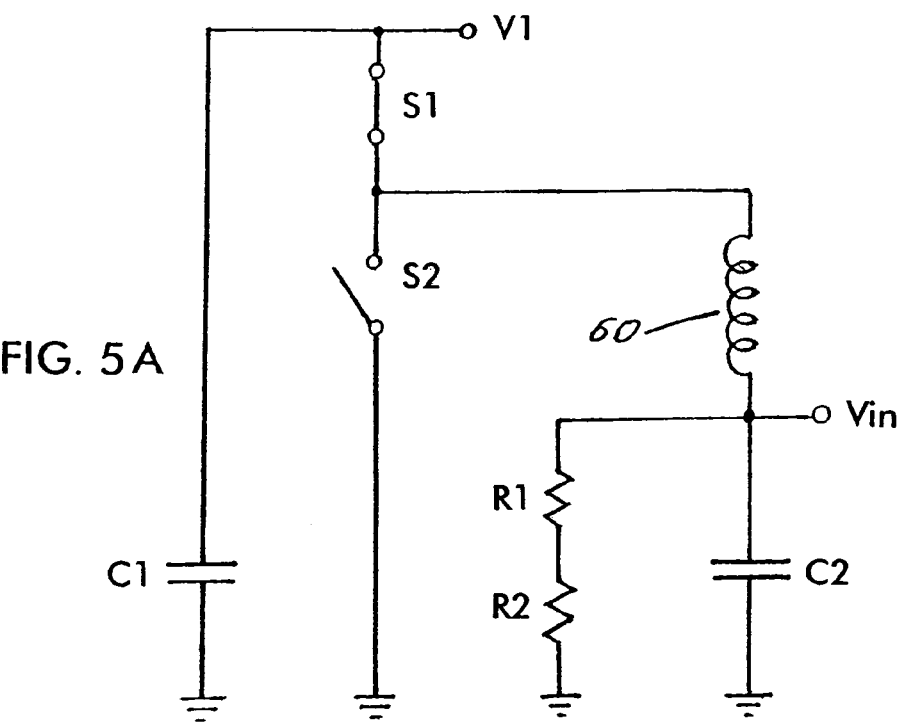
FIGS. 5A and 5B show simplified primary circuits using switching devices that are alternating on and off.
Figure 5B:
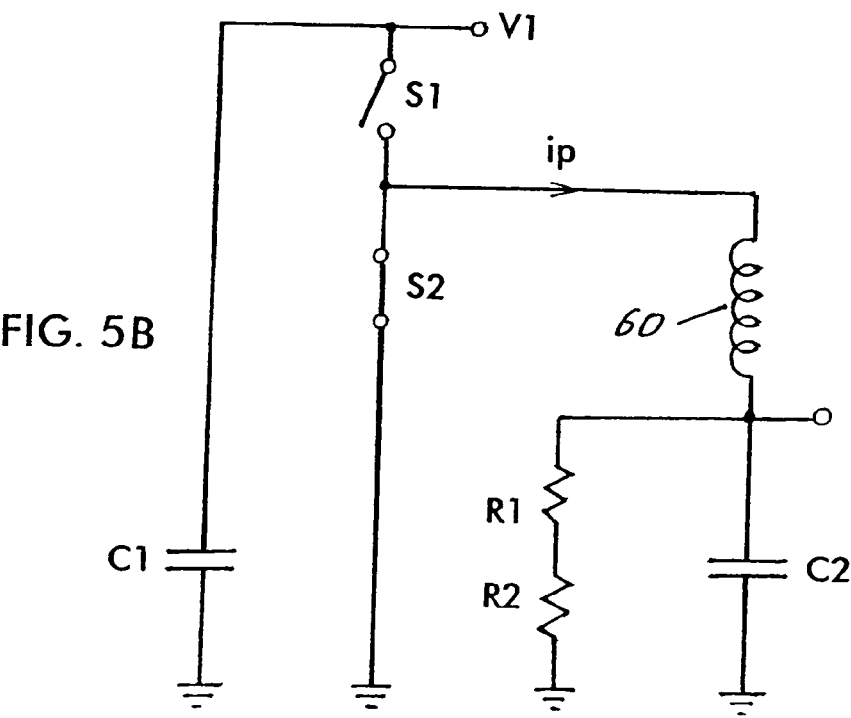

A voltage $V_{in}$ is connected to the opposite end of the primary winding 60 across another capacitor 63 having a capacitance C2 and a resistor divider 70, 71. The resistor divider 70, 71 is connected at the node between the two resistors 70, 71 to the positive (+) input of an hysteretic comparator 72. An oscillator 73 is connected to the negative (−) input of the comparator 72. The output of the comparator 72 is applied to the gates of the MOSFETs 50, 51 providing a circuit for controlling the switching of the MOSFETs 50, 51. The input to the gate of transistor 51 is inverted such that the MOSFETs 50, 51 are switched alternatingly. Thus, the first MOSFET 50 is switched on when the second MOSFET 51 is off and vice versa, as shown schematically in FIGS. 5A and 5B.

In one embodiment, a primary side half-bridge operates under zero-voltage-transition (ZVT) conditions, reducing switching losses. For example, the half-bridge is driven at a 50% duty cycle, and a switching frequency $f_s$ is selected greater than the series resonance frequency between the transformer 61 and the capacitor 63 that is connected to the transformer 61.

The transformer winding 62 on the secondary side of the transformer is connected to rectifier diodes 80, 81 and capacitors 82 and 83, functioning as a voltage doubler in a bridge rectifier circuit. The bridge rectifier may comprise only two diodes 80, 81 (e.g. FIG. 2A) both located in the secondary side, reducing the losses compared to rectifiers having voltage drops across rectifiers also in a conventional primary stage. Also, the rectifier capacitance of the rectifier bridge capacitors 82, 83 may be less than 1 $\mu$F. The voltage drop across each of the bridge capacitors 25, 26 is $V_1/2$, resulting in a no load output voltage equal to $V_1$, if losses occurring in the transformer 21 are neglected.

A load current causes the output voltage $V_o$ to decrease with increasing load, and the output circuit 7 is selected to control the output voltage $V_o$ within an acceptable range.

Figure 2C:
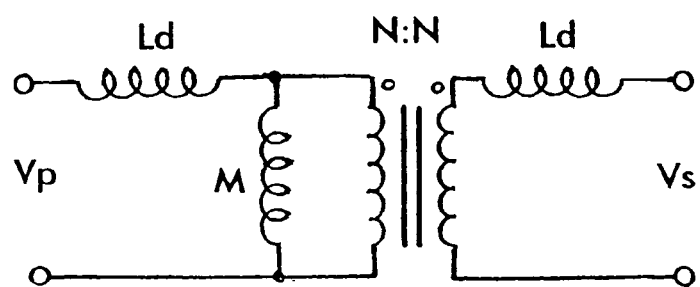
FIG. 2C shows equivalent inductive elements for a planar isolation transformer having two identical windings of N turns each.

Assuming a linear dependence between the output voltage $V_o$ and the output current $I_o$, the converter can be represented as a real voltage generator with a no-load voltage $E_{Th}$ and an output resistance $R_{Th}$ and may be evaluated by considering $E_{Th}$ and $R_{Th}$ the equivalent scheme of the transformer shown in FIG. 2C, resulting in the following analysis. The difference in the voltage $(V_p - V_c)$ across the primary winding 60 and the secondary winding 62 is defined as:

$$V_p - V_s = L_d \frac{d i_p}{d t} + L_d \frac{d i_s}{d t} \qquad (1)$$

and the voltage $V_p$ across the primary winding is defined as:

$$V_p - L_d \frac{d i_p}{d t} = M \frac{d i_m}{d t} = M \left( \frac{d i_p}{d t} - \frac{d i_s}{d t} \right) \qquad (2)$$

Relation (2) may be rearranged, isolating the differential of the input current $i_p$ with time t on the left side of the equation:

$$\frac{d i_p}{d t} = \frac{1}{M + L_d} V_p + \frac{M}{M + L_d} \frac{d i_s}{d t}. \qquad (3)$$

Thus, substituting equation (3) in equation (1) yields the equation:

$$V_p - V_s = \frac{L_d}{M + L_d} V_p + \frac{L_d M}{M + L_d} \frac{d i_s}{d t} + L_d \frac{d i_s}{d t}. \qquad (4)$$

Next, a coupling coefficient k is defined as the following:

$$k = \frac{M}{M + L_d}, \qquad (5)$$

and by rearranging equation (4) and substituting identity (5) equation (4) may be rewritten as:

$$k V_p - V_s = (1 + k) L_d \frac{d i_s}{d t}. \qquad (6)$$

For the computation of the no-load voltage $E_{Th}$ we observe that, if the output current $i_s$ equals 0, then relation (6) reduces to $V_s = k V_p$. If $V_s = k V_p$ and $V_p = V_1/2$ when the second MOSFET 51 is on and $V_p = -V_1/2$ when the second MOSFET 51 is off, then $V_s$ is defined as follows:

$$V_S = \begin{cases} k \frac{V_1}{2} & \text{when the MOSFET 51 is ON} \\ -k \frac{V_1}{2} & \text{when the MOSFET 51 is OFF.} \end{cases} \qquad (7)$$

Thus, both bridge capacitors 82, 83 are charged at $kV_1/2$ and the no load voltage $E_{Th}$ is defined by the equation:

$$E_{Th} = kV_1 \qquad (8)$$

Figure 7:
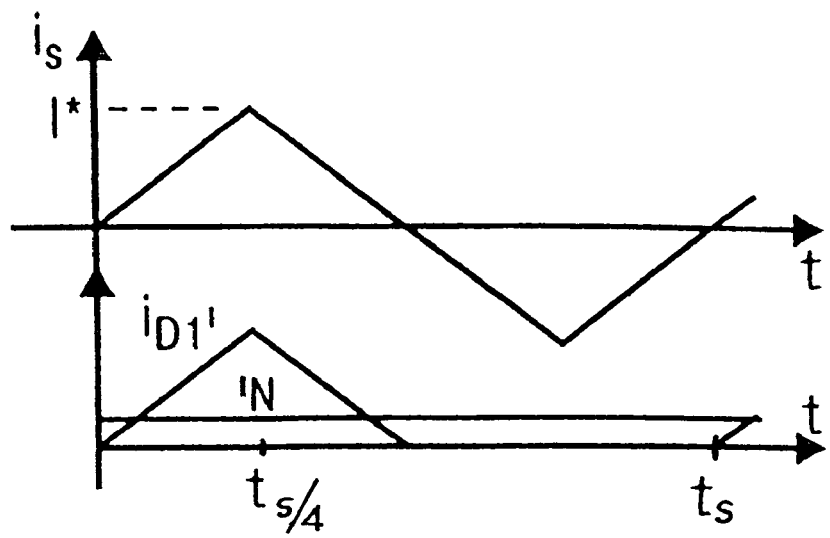
FIG. 7 illustrates a graph of the secondary output current under short circuit conditions, and the positive half-wave current $i_{D1}$, of one embodiment of the invention.

Then, the no-load output resistance $R_{Th}$ can be evaluated as follows:

$$R_{Th} = \frac{E_{Th}}{I_N}, \qquad (9)$$

where $I_N$ is the short-circuit output current. $I_N$ is equal to the average value of the current through secondary side bridge diodes 80, 81, which is the positive half-wave of the secondary output current $i_s$; therefore, $I_N$ may be approximated as one fourth of the positive amplitude of $I^*$ of the secondary output current $i_s$. The short circuit current $I_N$ equals $I^*/4$, if the secondary output current $i_s$ is a sawtooth waveform, as shown in FIG. 7. The positive amplitude $I^*$ may be determined by the product of the slope $di_s/dt$ and one-fourth the period $T_s$. Thus, the short-circuit condition $V_s = 0$ can be substituted in relation (6) obtaining an equation for the derivative of current with respect to time:

$$\frac{d i_s}{d t} = \frac{kV_{cc}}{2(1+k)L_d}, \qquad (10)$$

and the amplitude $I^*$ is determined by the equation:

$$I^* = \frac{T_s}{4} \frac{d i_s}{d t} = \frac{kV_{cc}}{8 f_s (1+k) L_d}. \qquad (11)$$

Since the period $T_s$ is the inverse of the frequency $f_s$, $I_N$ may be determined by the equation:

$$I_N = \frac{I^*}{4} = \frac{kV_{cc}}{32 f_s (1+k) L_d} \qquad (12)$$

and by substitution, $$R_{Th} = \frac{E_{Th}}{I_N} = 32 f_s (1+k) L_d. \qquad (13)$$

In one embodiment, the equivalent output resistance $R_{Th}$ has a high resistance, which causes the output voltage $V_s$ to decrease rapidly with an increase in the load current. Thus, in this embodiment, a post regulation stage is preferred to maintain the output voltage within acceptable limits of the rated output voltage.

Figure 8:
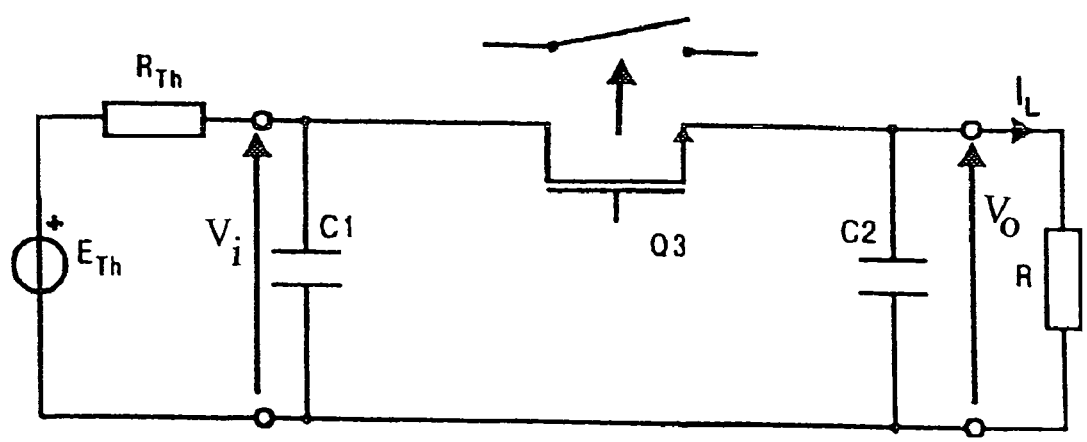
FIG. 8 shows an equivalent circuit for the converter of the invention.

This post regulation stage uses the power architecture of a linear regulator, that is, a power transistor is connected in series between the source (first stage of the converter) and the load, with the difference that the transistor is used as a power switch, instead of a variable resistance. FIG. 8 shows this schematically.

In one embodiment, the positive output of the rectifier circuit is connected to an output circuit 7 comprising a third MOSFET 90 connected to output capacitor 91 and output terminal 92. The output circuit 7 further comprises an output voltage sensing circuit 93, 94, 96, 97 including a resistor divider 93, 94, which has its node between the resistors 93, 94 connected to the positive (+) terminal of another hysteretic comparator 96. The negative (−) terminal is connected to a reference voltage, $V_{ref}$, 97. The output of the comparator 96 is connected to the gate of the MOSFET 90 and switches MOSFET 90 such that an output voltage $V_o$ is provided across an output capacitor 91 and a load (not shown), without using an inductor in the output circuit 7.

FIG. 2A shows one embodiment of a secondary stage comprising an output circuit 7. A power transistor is connected in series between the output of the rectifier circuit and the load. The transistor 90 is used as a power switch, instead of a variable resistance, allowing the resistance of the output circuit transistor 90 to be low, and the efficiency of the output circuit high.

Figure 9:
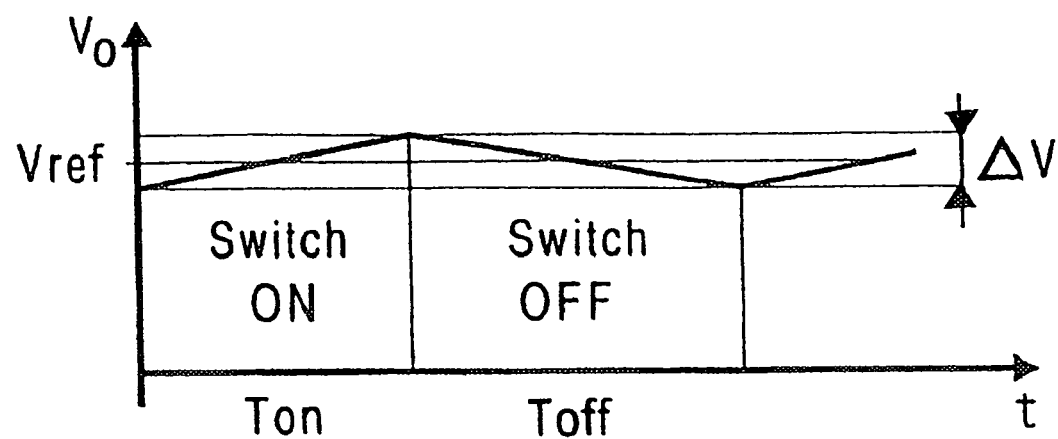
FIG. 9 is a graph of the output voltage of the converter.

The first stage of the rectifier circuit may be represented by an equivalent circuit having an equivalent voltage source of $E_{Th}$, an equivalent output resistance of $R_{Th}$ and capacitance $C_1$ that represents the capacitance of the bridge rectifier circuit. The capacitance $C_1$ may be less than 1 µf, for example. The output circuit 7 is represented by a switch 90 and a capacitor 91 as shown in FIG. 2A having a capacitance of $C_o$. The equivalent load is a resistance R across equivalent load voltage $V_L$ with an equivalent load resistance $I_L$ Equivalent load voltage $V_L$ represents output voltage $V_o$ in FIG. 2A. Thus, when switch 90 is on during period $T_{on}$, the capacitor 91 is being charged, and when switch 90 is off during period $T_{off}$, the capacitor 91 discharges across the load $V_L$. This is shown in FIG. 9.

When the switch 90 is activated under load, then the voltage at the output of the rectifier circuit reduces from $E_{Th}$ to $V_{ref}$. The reduction in voltage is shared between voltage drops across the load and the switch 90. Thus, switching losses may be evaluated to determine the output voltage across the load.

The output power P is maximum $P_{MAX}$ when the switch is always in the ON state and, assuming that $V_L=V_{ref}$, the maximum output power is:

$$P_{MAX} = \frac{V_{ref}(E_{Th} - V_{ref})}{R_{Th}}. \quad (14)$$

Preferably, at a given output power no greater than $P_{MAX}$, the output voltage ripple $\Delta V$ is negligible with respect to the rated output voltage $V_{ref}$. Thus, the ripple voltage $\Delta V$ is shown by the following equations:

$$\frac{\Delta V}{T_{on}} = \frac{P_{MAX} - P}{C_o V_{ref}}, \quad \text{and} \quad (15)$$

$$\frac{\Delta V}{T_{off}} = \frac{P}{C_o V_{ref}} \quad (16)$$

from $T_{on}$ and $T_{off}$ equations, the switching frequency, which equals the inverse of the sum of $T_{on}$ and $T_{off}$ is given by:

$$f = \frac{1}{T_{on} + T_{off}} = \frac{P(P_{MAX} - P)}{\Delta V \cdot C_o V_{ref} \cdot P_{MAX}}. \quad (17)$$

Thus, the switching frequency f of the output circuit switch 90 depends on the desired output power. The switching frequency f is a maximum when the output power is half maximum $P_{MAX}/2$. Thus, the maximum switching frequency $f_{MAX}$ is given by:

$$f_{MAX} = \frac{P_{MAX}}{4\Delta V \cdot C_o V_{ref}}. \quad (20)$$

Now, the maximum power loss of the switch $P_{sw}$ may be estimated by assuming that, during the discharge of the equivalent capacitance $C_1$, the switch has a constant resistance. Then, the resistance of the switch 90 dissipates an energy $E_{on}$ given by the equation:

$$E_{on} = \frac{1}{2} C_1 (E_{Th} - V_{ref})^2. \quad (21)$$

Therefore, the maximum power loss of the switch, which depends on the maximum switching frequency, is estimated by the following equation:

$$P_{sw} = f_{MAX} E_{on}. \quad (22)$$

One example of a converter according to the present invention is shown in FIGS. 2A and 2B. For example, Table 1 reports the electrical specifications of one example.

TABLE 1

| Electrical Specification of Example 1 | | | | | |
|---|---|---|---|---|---|
| Vin [V] | V [V] | ΔV [V] | P [W] | Vins [kV] | $C_o[\mu F]$ |
| 12–18 | 15 | ±0.1 | 6 | 10 | 150 |

With respect to FIG. 2B, the input voltage $V_{in}$ is connected to the DC blocking capacitor 63 providing a regulated half-bridge voltage $V_1$. In particular, $V_1=V_{in}/\delta$, where δ is the half-bridge duty cycle. Due to the feed forward structure of the pulse width modulation (PWM) modulator, the duty cycle is proportional to $V_{in}$, that is, $\delta=K_{PWM}V_{in}$, so that the half-bridge voltage $V_1$ is $V_1=V_{in}/\delta=1/K_{PWM}$, that is $V_1$ is constant for a large $V_{in}$ variation range. For example, for a regulated voltage $V_1$ of 32 volts, the duty cycle ranges from 40% for an input voltage $V_{in}$ of 12 V to 60% for an input voltage $V_{in}$ of 18 volts, where the duty cycle of the control circuit is proportional to the input voltage $V_{in}$.

Table 2 reports the parameters of the transformer of one example. The parameter d is the thickness of the PCB copper traces. The magnetic parameters Ld and M were measured using an HP4964 impedance analyzer.

TABLE 2

Example Parameters of the Transformer

| a [mm] | b [mm] | p [mm] | w [mm] | s [mm] |
|---|---|---|---|---|
| 16 | 22 | 4.5 | 1 | 2.5 |
| d [μm] | N | Ld [μH] | M [μH] | K |
| 75 | 7 | 0.32 | 2.02 | 0.86 |

Figure 10:
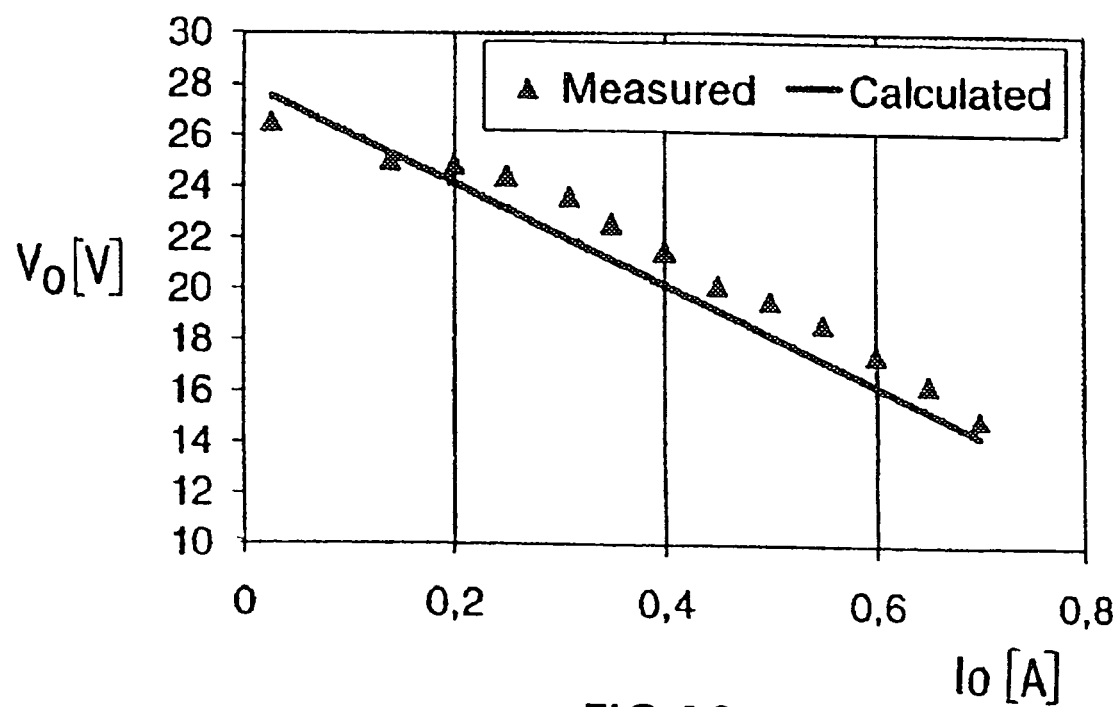
FIG. 10 is a graph of the output from the bridge rectifier stage.

From the transformer parameters of Table 2, equations (8) and (13) provide an equivalent no-load voltage $E_{Th}$ and resistance $R_{Th}$ of 27.5V and 19.6 Ω, respectively. FIG. 10 shows the characteristic at the output of the rectifiers 80, 81 measured across capacitors 82, 83. The resulting converter had an isolation voltage greater than 10 kV at an output power of 2 watts. The output voltage was 18.5 V and the converter efficiency at full load was about 65%.

Figure 6A:
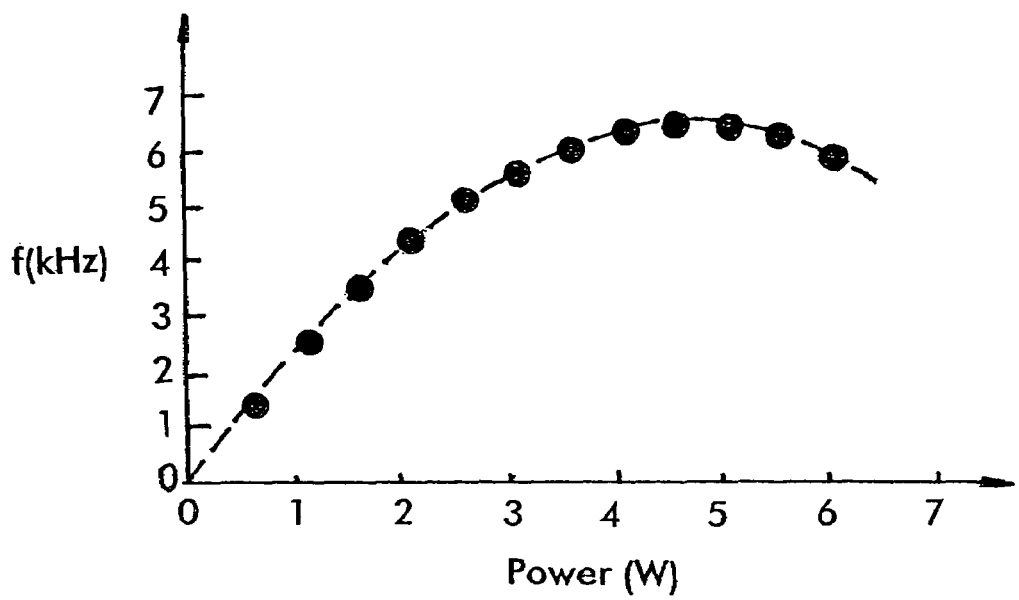
FIG. 6A illustrates a graph of frequency (f) versus power of one embodiment of the present invention.
Figure 6B:
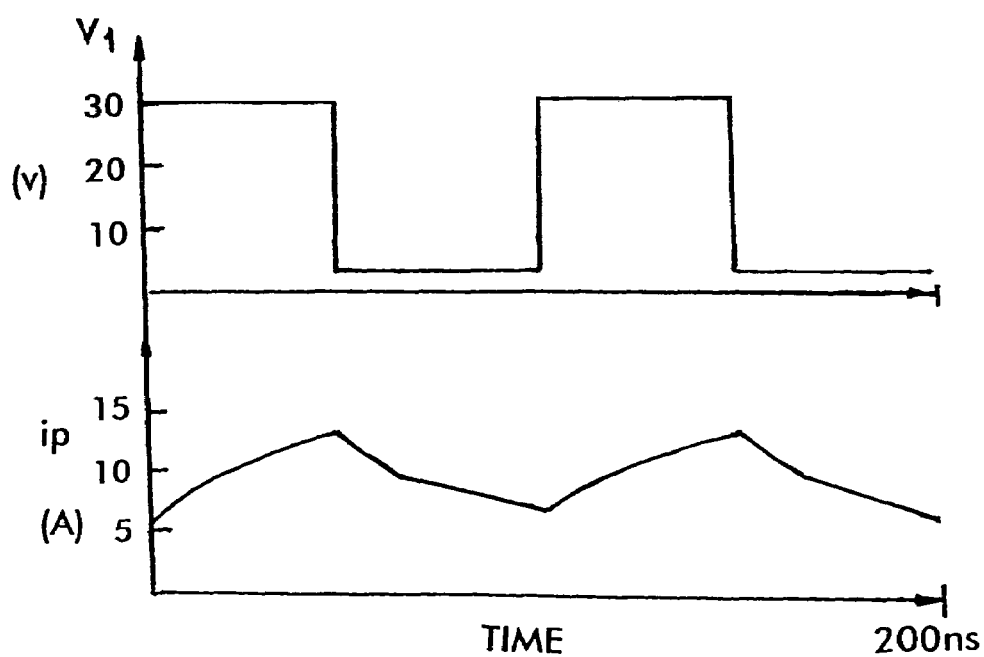
FIG. 6B illustrates a graph of voltage $V_1$ and current through the primary winding versus time for one embodiment of the present invention.
Figure 11:
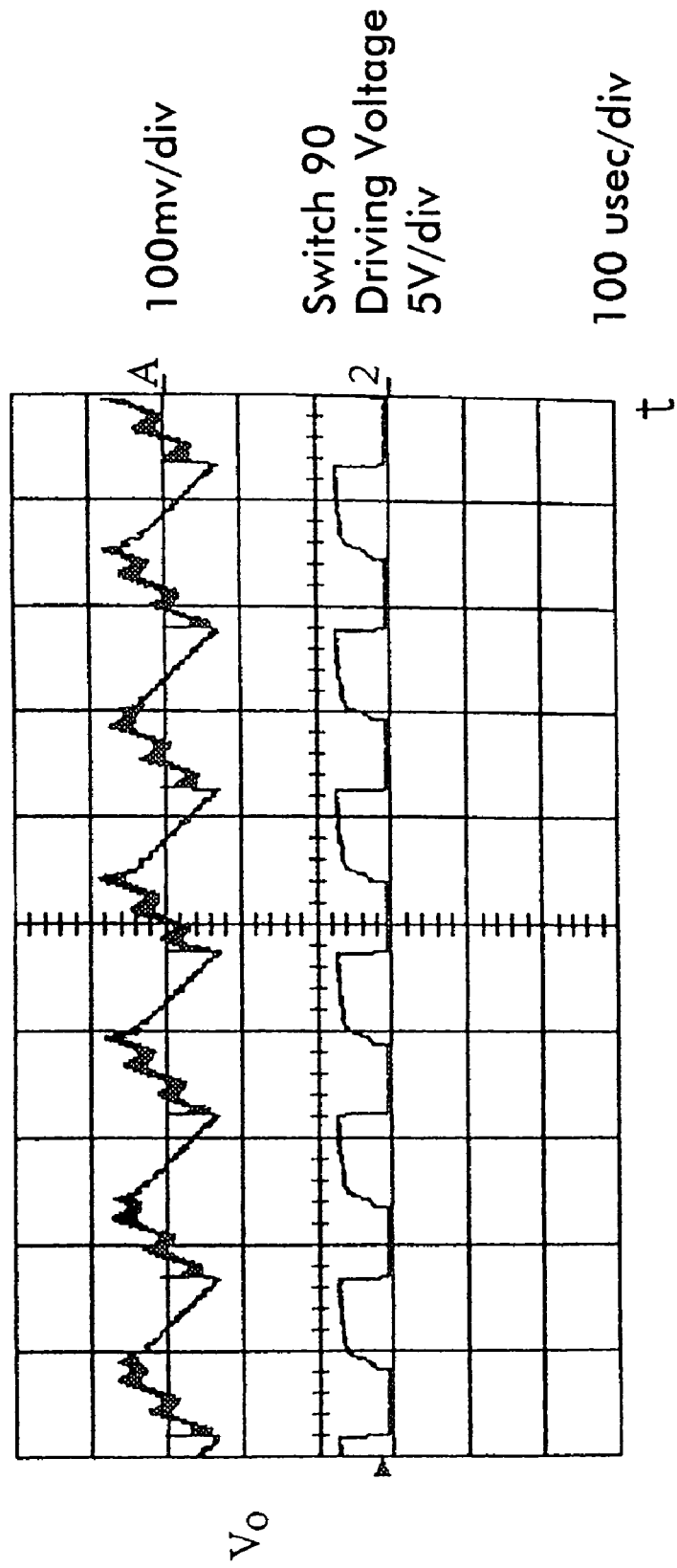
FIG. 11 shows waveforms in the second stage of the converter.

FIG. 6B shows the first stage waveforms at full load for the example of Table 2 at a switching frequency of 1 MHz with an input voltage $V_{in}$ of 15 volts. FIG. 11 shows the post regulation stage 7 waveforms at 4.7 W output power. The top waveform is the output voltage $V_o$ where each y axis division is 100 mv. The bottom waveform shows the switch 90 driving voltage at 5v/division. The time axis is 100 usec/division. The output voltage ripple $\Delta V$ of the output circuit 7 was 150 mV, which was imposed by the hysteretic control adopted. The maximum output power $P_{MAX}$ predicted from relation (14) is 9.5 W, with a maximum switching frequency $f_{MAX}$ of 7.08 kHz. The predicted maximum switching frequency is in good agreement with the measured value of $f_{MAX}$ of 6.56 kHz. For example, FIG. 6A shows the actual switching frequency measured at various output power values, which compares favorably to the calculated values shown by the dashed line. The maximum switching losses $P_{sw}$ are obtained by evaluating equations (21) and (22) and equal 50 mW, which demonstrates good efficiency of the output circuit 7. The global efficiency of the bridge, including the control circuit consumption, is equal to 65% and is reached at full load. The losses reducing the global efficiency are related to no-load losses caused by a high magnetizing current.

Thus, Example 1 shows that a 6 W DC/DC power supply with high isolation voltage is obtained using a coreless PCB transformer 90. The transformer 90 introduces high output impedance. The maximum output power may be determined. Then, a step-down post-regulation converter without an inductive element in the output circuit 7 may be comprised of components such that an acceptable ripple voltage $\Delta V$ and output voltage $V_o$ is obtained for a wide range of input voltage $V_{in}$.

When the circuit of FIGS. 2A and 2B has no load applied, the output voltage of the rectifier circuit equals the voltage $V_1$. For example, the maximum value of this no-load voltage may be set at 30 volts, if the regulated output voltage $V_o$ is to be 15 volts when a load is applied to the circuit at the output terminal 92. Then, the components of the circuit may be selected such that an acceptable ripple voltage $\Delta V$ and output circuit efficiency are achieved.

Figure 1:
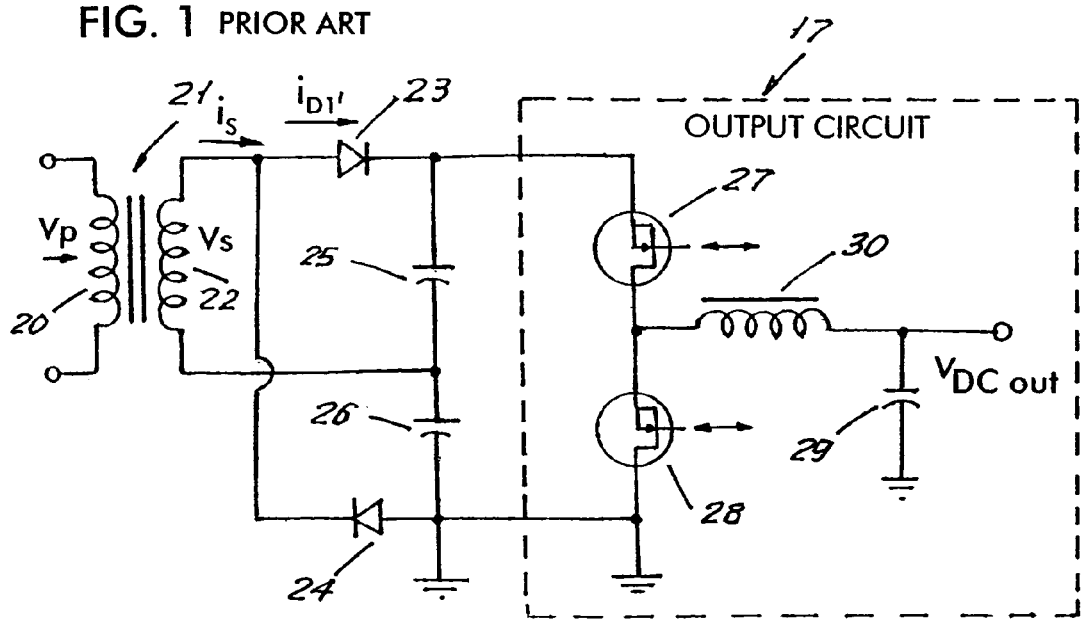
FIG. 1 shows a prior art SMPS with an inductor in the output circuit.

The step-down converter of FIG. 2A regulates the output voltage. This is accomplished by the transistor 90 and the capacitor 91 of the output circuit, without any inductor in the output circuit 7. In contrast, a conventional circuit requires an inductor for increasing the impedance of the output circuit 17, as shown in FIG. 1. The transistor 90 is turned on by the control circuit only as long as needed to let output voltage $V_o$ reach the target value. When this value is reached, the transistor 90 is turned off. Whenever $V_o$ falls below the target value, as current is drawn from the capacitor 91, then the control circuit turns transistor 90 on, increasing the output voltage $V_o$ and returning the value of the voltage at the node of the resistor divider 93, 94 to $V_{ref}$ before repeating the duty cycle again.

In one example, a coreless 6-watt power supply has a primary circuit of FIG. 2B including two MOSFETs 50, 51, such as International Rectifier MOSFETs IRFL014N, and two capacitors 52, 63 with capacitance C1, C2 of 2.2 μF. The second capacitor 63 acts as a DC blocking capacitor. Pulse width modulation by a control circuit including a resistor divider 70, 71, an oscillator 73 and a comparator 72 drives the MOSFETs 50, 51 such that the half bridge voltage $V_1$ is regulated.

Figure 3:
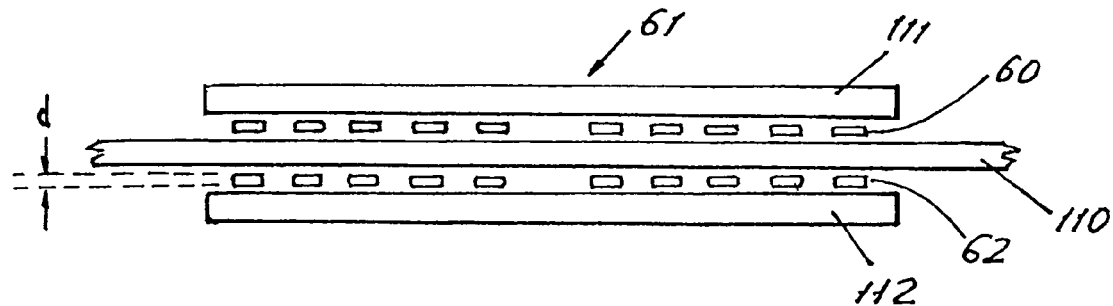
FIG. 3 is a cross section of a printed circuit board (PCB) carrying the novel planar transformer of the invention.
Figure 4:
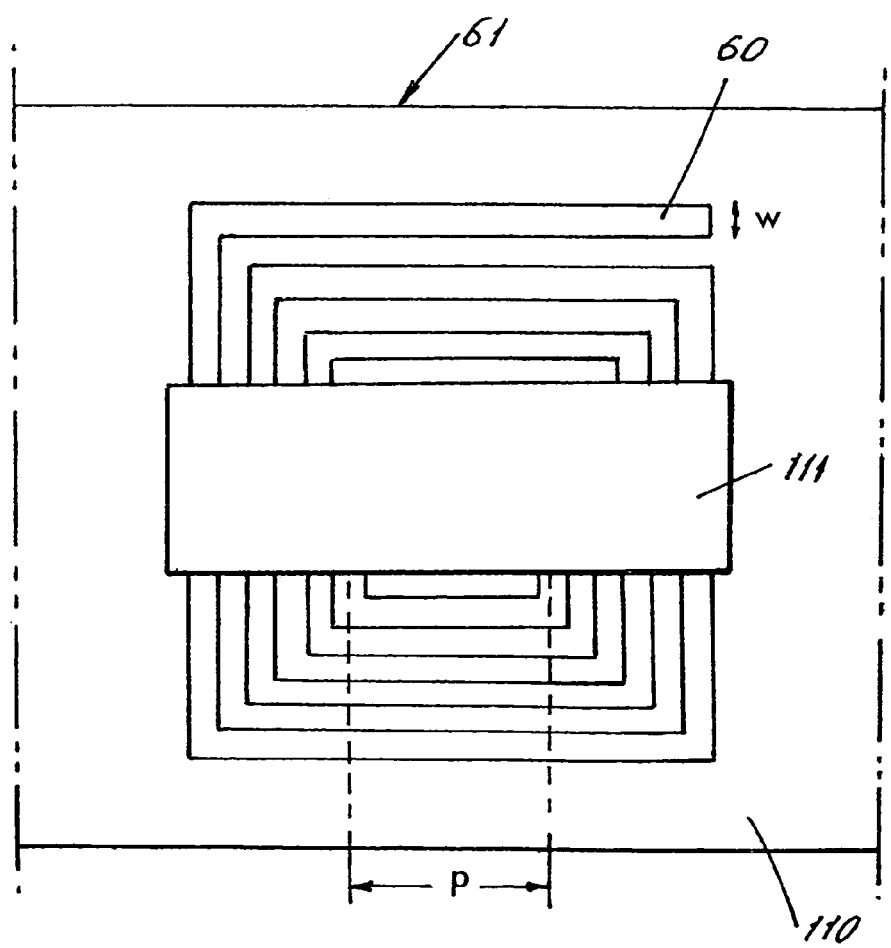
FIG. 4 is a schematic top view of FIG. 3 showing one winding and an overlying Ferrite "core" plate.

The planar isolation transformer of the coreless 6-watt power supply is shown in FIGS. 3 and 4. Windings 60, 62 are formed on opposite surfaces of a thin insulative printed circuit board 110. A metal deposition process may be used to deposit metal winding 60, 62 on the surface of the board 110. Thin ferrite plates 111 and 112 are then adhered atop the primary and secondary windings 60, 62, respectively, providing a planar transformer for use in the switch mode power supply of the present invention, for example. The ferrites 111 and 112 have a width of 16 mm, a length of 22 mm and a thickness of 2.5 mm. The pair of copper coils 60, 61 have a thickness d of 75 μm, a coil width w of 1 mm and an inner coil length p of 4.5 mm.

The printed circuit board 110 (partially shown in FIGS. 3 and 4) may use a standard dielectric for printed circuit board substrates, such as an FR4 substrate having a thickness of 1.5 mm. The planar isolation transformer of the coreless 6-watt power supply has two identical windings of N turns. Thus, it can be represented by the equivalent structure of FIG. 2C, which shows equivalent inductive elements having inductance $L_d$ and M. As measured by a Hewlett-Packard Impedance Analyzer, such as HP4964, the inductance $L_d$ of one transformer 90 is 0.32 μH and the inductance M of the same transformer 90 is 2.02 μH.

The voltage across the MOSFETs 50, 51, in the primary stage $V_1$ is shown in FIG. 6B superposed above the input current of the primary winding 60 for a primary stage having a switching frequency of 1 MHZ. The output stage of the 6-watt power supply of this embodiment has a pair of capacitors 82, 83 with a capacitance $C_3$ of 220 nF and an output capacitor 91 with a capacitance $C_o$ of 100 μF. For example, FIG. 6A shows the secondary stage switching frequency as a function of output power. For example, at an output power of 4 watts, the switching frequency is 6.56 kHz, and the output voltage has a voltage ripple of less than 200 mV peak to peak. The switching frequency of the output stage MOSFET 90 reaches a maximum at an output power of about 5 watts. The output voltage ripple $\Delta V$ is negligible compared to the rated output voltage of 15 V. Thus, a 6-watt power supply with high isolation voltage is achieved using a coreless PCB transformer 61 without introducing an inductor in the output circuit 7.

The step-down converter of the output stage of the 6-watt DC isolated switch mode power supply has a low capacitance $C_3$ of the pair of capacitors 82, 83, allowing low MOSFET switching losses. Thus, the converter is suitable for post regulation of transformers with high stray inductance, such as planar coreless transformers.

In an alternative example, the transformer uses no ferrite plates. Copper coils are deposited on opposite surfaces of a printed circuit board, such as an FR4 substrate. For example, the copper coils have a width in the range between 12.5 to 36 mm, a length in the range from 7.5 mm to 24 mm and a filament width of 200 μm. The center-line to center-line distance between two coils may be 400 μm. The deposition depth of the coil may be 75 μm. Thus, the copper coils may be deposited using ordinary methods for laying copper traces on printed circuit boards, for example.

Although the present invention has been described in relation to particular embodiments thereof, many other variations and modifications and other uses will become apparent to those skilled in the art. Therefore, the present invention should be limited not by the examples herein, but only by the claims themselves.

What is claimed is:

1. A switch mode power supply for supplying an output voltage and current to a load, comprising:
    a transformer including a primary winding and a secondary winding;
    a primary circuit comprising a switching stage electrically coupled to the primary winding of the transformer; and
    a secondary circuit connected to the secondary winding of the transformer, wherein the secondary circuit comprises a rectifier circuit electrically coupled on an input side to the secondary winding, the rectifier circuit providing a rectified output voltage to a storage capacitor, and an output circuit including a switching device electrically connected on one side of the switching device to the rectifier circuit and on another side of the switching device to one side of an output capacitor, an output terminal and an input of a voltage sensing and control circuit, and the voltage sensing and control circuit providing an output that controls switching of the switching device such that the output voltage is regulated, further wherein the output circuit does not comprise an inductor.

2. The power supply of claim 1, wherein the switching device comprises a semiconductor field effect transistor having a source, a drain and a gate.

3. The power supply of claim 2, wherein the voltage sensing and control circuit comprises a resistor divider electrically connected across the output capacitor and having a node electrically connected to a comparator, and the comparator compares a voltage at the node to a reference voltage and is operably connected to the gate of the field effect transistor such that field effect transistor is switched on and off regulating the output voltage.

4. The power supply of claim 1, wherein the voltage sensing and control circuit comprises a resistor divider electrically connected across the output capacitor and having a node electrically connected to a comparator, and the comparator compares a voltage at the node to a reference voltage and is operably connected to the switching device, such that the switching device regulates the output voltage.

5. A switch mode power supply for supplying an output voltage and current to a load, comprising:
    a transformer including a primary winding and a secondary winding;
    a primary circuit comprising a switching stage electrically coupled to the primary winding of the transformer; and
    a secondary circuit connected to the secondary winding of the transformer, wherein the secondary circuit comprises a rectifier circuit electrically coupled on an input side to the secondary winding, the rectifier circuit providing a rectified output voltage to a storage capacitor, and an output circuit including a switching device electrically connected on one side of the switching device to the rectifier circuit and on another side of the switching device to one side of an output capacitor, an output terminal and an input of a voltage sensing and control circuit, and the voltage sensing and control circuit providing an output that controls switching of the switching device such that the output voltage is regulated, wherein the primary circuit comprises a resistor divider electrically connected across a DC blocking capacitor, the resistor divider having a node, the node being electrically connected to a comparator such that a second switching device and a third switching device are alternatingly switched on and off at a frequency determined by an oscillator.

6. The power supply of claim 5, wherein the frequency is at least 100 kHz.

7. The power supply of claim 5, wherein the capacitance of the rectifier circuit is less than 1 μF.

8. The power supply of claim 1, wherein the rectifier circuit comprises first and second diodes coupled as a voltage doubler.

9. The power supply of claim 1, wherein the transformer comprises a planar isolation transformer.

10. A switch mode power supply for supplying an output voltage and current to a load, comprising:
    a transformer including a primary winding and a secondary winding;
    a primary circuit comprising a switching stage electrically coupled to the primary winding of the transformer; and
    a secondary circuit connected to the secondary winding of the transformer, wherein the secondary circuit comprises a rectifier circuit electrically coupled on an input side to the secondary winding, the rectifier circuit providing a rectified output voltage to a storage capacitor, and an output circuit including a switching device electrically connected on one side of the switching device to the rectifier circuit and on another side of the switching device to one side of an output capacitor, an output terminal and an input of a voltage sensing and control circuit, and the voltage sensing and control circuit providing an output that controls switching of the switching device such that the output voltage is regulated,
    wherein the transformer comprises a planar isolation transformer, and
    wherein the planar isolation transformer comprises a printed circuit board transformer comprising the primary winding and the secondary winding deposited on opposite sides of a printed circuit board.

11. An output circuit for a step-down converter, the step-down converter having an output voltage across a first lead and a second lead, the output circuit comprising:
    a switching device electrically connected on one side of the switching device to the first lead and on another side of the switching device to one side of a capacitor, an output terminal and an input of a voltage sensing and control circuit, wherein the voltage sensing and control circuit is operably connected to the switching device such that the switching device regulates the output voltage of the step-down converter, the voltage sensing and control circuit switching the switching device on when the output voltage drops below a reference voltage, further wherein an inductor is not coupled in the output circuit.

12. The output circuit of claim 11, wherein the switching device comprises a semiconductor field effect transistor having a source, a drain and a gate, and the voltage sensing and control circuit is operably connected to the gate of the field effect transistor.

13. An output circuit for a step-down converter, the step-down converter having an output voltage across a first lead and a second lead, the output circuit comprising:

a switching device electrically connected on one side of the switching device to the first lead and on another side of the switching device to one side of a capacitor, an output terminal and an input of a voltage sensing and control circuit, wherein the voltage sensing and control circuit is operably connected to the switching device such that the switching device regulates the output voltage of the step-down converter, the voltage sensing and control circuit switching the switching device on when the output voltage drops below a reference voltage, wherein the switching device comprises a semiconductor field effect transistor having a source, a drain and a gate, and the voltage sensing and control circuit is operably connected to the gate of the field effect transistor, and wherein the output voltage sensing and control circuit comprises a hysteretic comparator and the hysteretic comparator compares a voltage related to the output voltage with a reference voltage such that the output voltage sensing and control circuit turns the field effect transistor on and off regulating the output voltage.

14. The output circuit of claim 12, wherein the semiconductor field effect transistor is a MOSFET.

* * * * *